Oct. 30, 1928.

R. E. FISHER 1,689,916

SCOOTER OR COASTER

Filed Aug. 28, 1924

2 Sheets-Sheet 1

Inventor
Robert E. Fisher
By Brockett, Hyde + Milburn
Attorneys

Oct. 30, 1928.
R. E. FISHER
SCOOTER OR COASTER
Filed Aug. 28, 1924
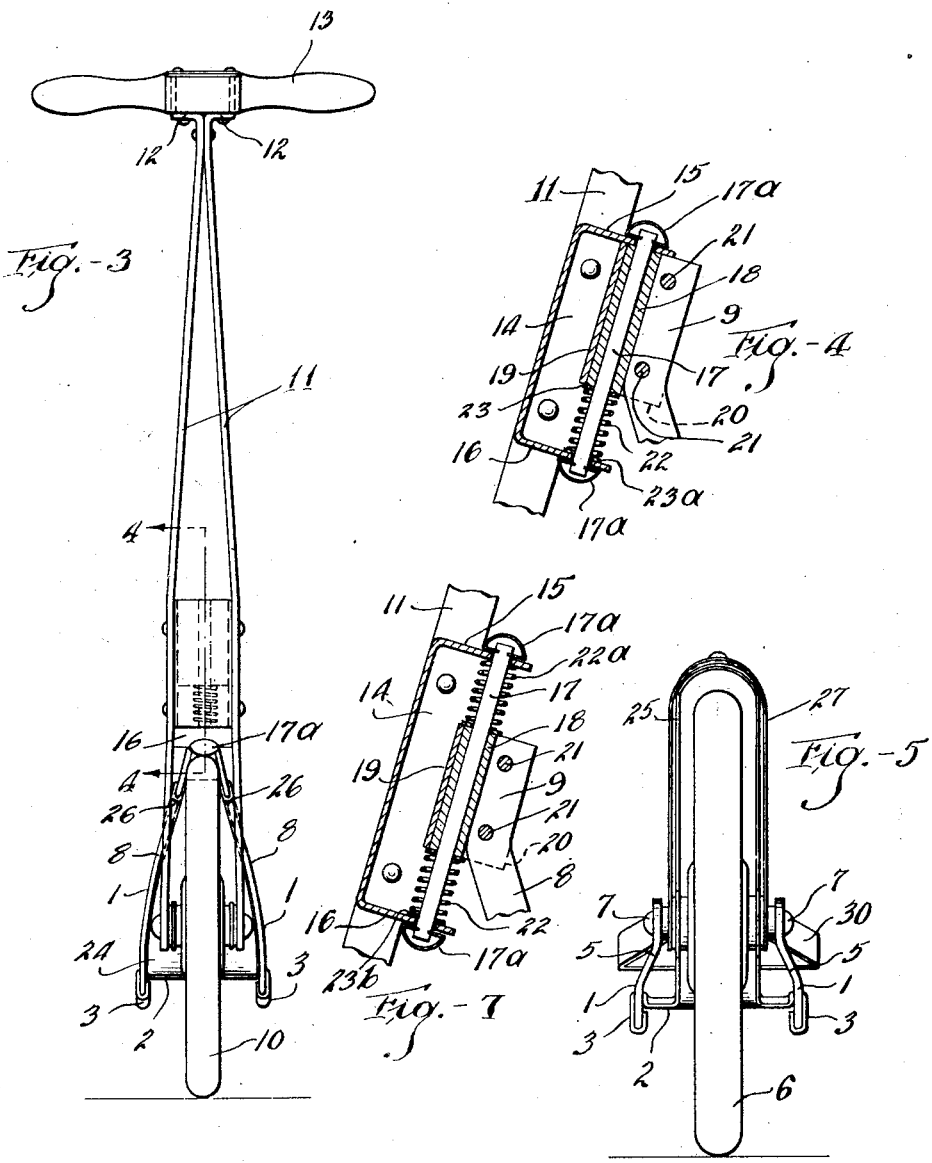
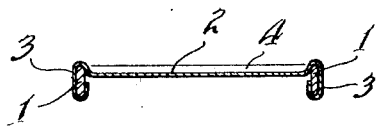

Patented Oct. 30, 1928.

1,689,916

UNITED STATES PATENT OFFICE.

ROBERT E. FISHER, OF CLEVELAND, OHIO, ASSIGNOR TO THE GEORGE H. BOWMAN COMPANY, OF CLEVELAND, OHIO, A CORPORATION OF OHIO.

SCOOTER OR COASTER.

Application filed August 28, 1924. Serial No. 734,739.

This invention relates to children's vehicles of the coaster or scooter type, comprising a low elongated platform or foot board supported by front and rear wheels and provided at its forward end with a suitable steering post or column, the child propelling the vehicle by impulses from one foot on the sidewalk or ground while the other foot rests on the platform.

The object of the present invention is to provide an improved scooter, the parts of which are of simple and inexpensive construction and capable of easy and rapid assembly, thereby enabling the vehicle to be manufactured and sold at relatively low cost; and which scooter is not only of neat and pleasing appearance but is also of exceptionally rugged or sturdy character so that it will successfully withstand the rough usage to which scooters are subjected by children.

A further object of the invention is to provide an improved scooter in which the forward end of the platform frame is yieldingly mounted on the steering column in which the front scooter wheel is journalled. The yieldability of this connection not only ensures unusually comfortable riding qualities, but also enables the parts forming this connection to better sustain the stresses and strains to which they are subjected.

A further object of the invention is to provide an improved scooter in which the platform or foot rest is not made of wood, as is usual, but of sheet metal with transverse ribs or corrugations. These corrugations not only materially strengthen and stiffen the platform, but also enable the child to firmly position his foot thereon for the proper propelling action with his other foot. The present liability of injury due to the child's foot accidentally slipping off the usual smooth platform is, therefore, avoided. In the preferred embodiment of the invention, the platform is provided with front and rear integral extensions, which are bent or curved to form wheel guards or fenders. These guards not only improve the appearance of the scooter but also assist in confining the child's foot upon the platform.

A further object of the invention is to provide an improved stand for maintaining the scooter in an upright position when not in use.

Further objects of the invention are in part obvious and in part will appear more in detail hereinafter.

Figure 1:
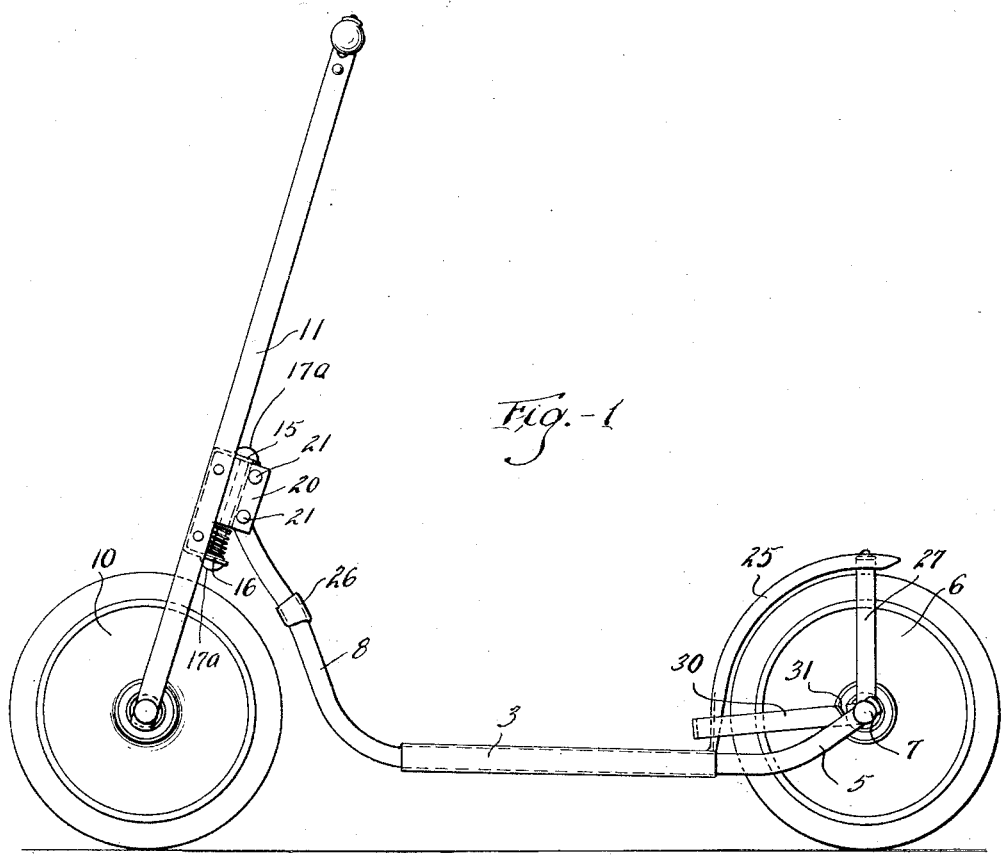
Figure 2:
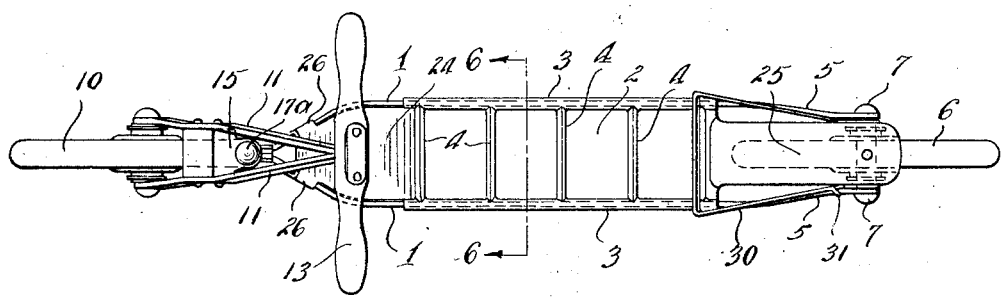

In the drawings, which represent one suitable embodiment of the invention, Fig. 1 is a side elevation of my improved scooter; Fig. 2 is a plan view thereof; Fig. 3 is a front elevation; Fig. 4 is a detail view of the pivotal yielding connection of the scooter frame and steering column taken on the line 4—4, Fig. 3; Fig. 5 is a detail rear elevation of the rear wheel and associated parts; Fig. 6 is a cross sectional view of the platform or foot rest, taken on the line 6—6, Fig. 2; and Fig. 7 is a view similar to Fig. 4 but showing upper and lower compression springs.

Referring to the drawings, the scooter comprises a suitable frame consisting of a pair of longitudinally disposed metal bars 1, the intermediate and rear portions of which are spaced about six or eight inches apart. Mounted upon the intermediate portion of these frame bars is the sheet metal platform or foot rest 2, the side edge portions of the platform being bent down and around the frame bars, as clearly indicated at 3, Fig. 6. The platform is provided with a series of transverse ribs or corrugations 4, which not only strengthen and stiffen the platform against bending strains but also enable the child to firmly position his foot upon the platform for the proper propelling action with his other foot, and without the present liability of injury due to his foot accidentally slipping off of the usually smooth wooden platform.

Such slipping is also prevented by the arrangement of the major or body portion of the platform lower than the side edge portions thereof, as clearly shown in Fig. 6.

The rear end portion of the frame bars extend or incline slightly upwardly, as clearly indicated at 5, Fig. 1, and at their ends are provided with suitable bearing apertures to receive the shaft or axle upon which the rear supporting wheel 6 is mounted, the axle being provided at its ends with suitable hub caps 7, as is usual. In the present embodiment, the rear wheel, and the front wheel hereinafter referred to, are of the metal disk type with rubber tires.

The front end portions of the frame bars not only extend or incline upwardly, as at 8, Fig. 1, but are also convergently arranged and terminate in slightly rearwardly inclined, abutting portions 9, Fig. 4. Arranged in advance of the angularly bent frame portions 8 is the front scooter wheel 10, which is journalled in the lower end portion of the slightly rearwardly inclined steering post or column. Said column consists of a pair of metal bars 11 arranged in upwardly converging relation and which terminate at their upper ends in outwardly extending flanges 12, which provide a substantially horizontal support for the usual wooden handle bar 13. While said bars are here shown as straight the lower end portions may be curved forwardly if desired. It will be noted that ample space is provided between the front wheel and the inclined frame portion 8 for the free and easy movements of the wheel and the steering column. The slight rearward inclination of the steering column not only improves the appearance of the coaster but also has a desirable effect in the steering operation, as will be readily understood.

Mounted between the steering column bars, just above the front wheel is a box shaped, king pin supporting bracket, the rearwardly extending side portions 14 of which engage and are riveted or otherwise suitably secured to the inner surfaces of the bars of the steering column. The rearwardly extending top and bottom portions 15, 16 of said bracket extend beyond the steering column bars and are provided with suitable registering apertures to receive the king pin 17 which is held in position by the end cap members 17ª.

Embracing the upper portion of said king pin and a bushing or tube 18 with which said king pin may be surrounded is a U-shaped clamping member 19, between the rearwardly extending clamping portions 20 of which the upper abutting frame bar portions 9 are confined and secured by the rivets 21. Surrounding the lower portion of the king pin is a suitable compression spring 22, the upper end of which abuts a washer 23 engaging the lower edge of the bushing 18 and the clamping member 19. The lower end of said spring abuts a washer 23ª engaging the upper surface of the bracket bottom portion 16. In Fig. 7 an upper compression spring 22ª is provided in addition to the lower spring 22. The upper end of spring 22ª engages the bracket top portion 15 while the lower end of the spring engages a washer 23ᵇ resting upon the upper edge of the bushing 18.

The yieldability afforded by the lower compression spring alone or with both springs not only ensures more comfortable riding qualities for the scooter but also enables the parts forming this important pivotal connection to better sustain the stresses and strains to which they are subjected, thereby materially prolonging the life of the scooter.

In the preferred embodiment of the invention, the platform or foot board is provided with front and rear extensions, preferably formed integral therewith, to provide front and rear wheel guards or fenders 24, 25. The front extension is bent upwardly to conform to the inclination of the frame bar portions, and at its extreme upper end is provided with side securing tongues 26 which are bent down and around the frame bars.

The rear extension is curved to conform to the circumference of the rear wheel, as clearly indicated in Fig. 1, the rear end portion of the extension or guard being supported by and secured to a U-shaped bracket 27 having its end portions mounted on the rear wheel axle. These front and rear guards or fenders not only materially improve the appearance of the scooter but also assist in confining the child's foot upon the platform in use of the vehicle.

As the scooter here illustrated is of the two wheel type, it will not stand upright unassisted. In order to save the scooter from unnecessary wear and tear resulting from the present practice of permitting the scooter to fall to the sidewalk or ground after use thereof, where it rests in an unsightly manner, the present scooter is provided with a suitable stand or support for holding it in an upright position when not in use. Said stand is here shown as comprising a U-shaped metal member 30, the ends of which are pivotally mounted on the rear axle. The transverse portion or side of the stand is, of course, straight and of sufficient length to provide a staple support for the scooter. When not in use, the stand occupies the position shown in Fig. 1, the end portions of the stand being notched, as at 31, to provide outwardly extending lugs which engage the lower surface frame bar portions so as to limit the backward or clockwise movement of the stand. When the stand is not in use these lugs engage the upper portion of the frame bars, as clearly shown in Fig. 1.

What I claim is:

1. A scooter or coaster, comprising a pair of spaced frame members, front and rear supporting wheels therefor, and a metal platform mounted on said frame members and having its side edge portions bent around said members so as to provide an interlocking connection therebetween.

2. A scooter or coaster, comprising a pair of spaced frame members, front and rear supporting wheels therefor, and a one-piece sheet metal platform mounted on said frame members and provided along its length with a series of upwardly extending spaced transverse ribs.

3. In a scooter or coaster, a pair of spaced, longitudinally extending frame bars adapted to have a steering column associated with their forward ends and a supporting wheel associated with their rear ends, and a sheet metal platform member mounted upon said frame bars by having its side edge portions bent to receive said frame bars intermediate their ends, said platform member being provided with a plurality of integral strengthening ribs extending transversely relative to said frame bars.

4. In a scooter or coaster, a pair of spaced, longitudinally extending frame bars adapted to have a steering column associated with their forward ends and a supporting wheel associated with their rear ends, and a sheet metal platform member mounted upon said frame bars by having its side edge portions bent upwardly and then downwardly to provide longitudinal channels to receive said frame bars intermediate their ends, the major or body portion of said platform member being thereby positioned beneath the top edges of said intermediate frame bar portions.

5. In a scooter or coaster, a pair of spaced, longitudinally extending frame bars adapted to have a steering column associated with their forward ends and a supporting wheel associated with their rear ends, and a sheet metal platform member mounted upon said frame bars by having its side edge portions bent upwardly and then downwardly to provide longitudinal channels to receive said frame bars intermediate their ends, the major or body portion of said platform member being thereby positioned beneath the top edges of said intermediate frame bar portions, said platform member being provided with a plurality of transverse strengthening ribs extending to the upwardly bent side portions thereof.

6. In a scooter or coaster, a pair of spaced, longitudinally extending frame bars adapted to have a steering column associated with their forward ends and a supporting wheel associated with their rear ends, and a sheet metal platform member mounted upon said frame bars by having its side edge portions bent to receive said frame bars intermediate their ends, said platform member being provided at its rear end with an upwardly extending wheel guard extension formed integral therewith, and bracket means at the rear ends of said frame bars for supporting said extension.

7. In a scooter or coaster, a pair of spaced, longitudinally extending frame bars having upwardly inclined front end portions, intermediate portions and rear end portions, and a sheet metal platform member mounted upon said frame bars by having its side edge portions bent to receive the intermediate portions of said frame bars, said platform member being provided at its front end with an upwardly inclined wheel guard extension formed integral therewith and having parts of its side edges bent around the front end portions of said frame bars.

8. In a scooter or coaster, a pair of spaced, longitudinally extending frame bars having upwardly inclined front end portions, intermediate portions and rear end portions, and a sheet metal platform member mounted upon said frame bars by having its side edge portions bent to receive the intermediate portions of said frame bars, said platform member being provided at its front end with an upwardly inclined wheel guard extension formed integral therewith and having parts of its side edges bent around the front end portions of said frame bars, said platform member being also provided at its rear end with an upwardly extending wheel guard extension formed integral therewith, and bracket means at the rear ends of said frame bars and extending upwardly into supporting engagement with said rear extension.

In testimony whereof I hereby affix my signature.

ROBERT E. FISHER.